No. 733,732. PATENTED JULY 14, 1903.
J. MÜLLER.
SCREEN FOR HOP SEPARATING MACHINES.
APPLICATION FILED MAR. 11, 1903.
NO MODEL. 2 SHEETS—SHEET 1.

WITNESSES
C. P. Goepel.
Henry J. Suhrbier.

INVENTOR
Jacob Müller
BY
Graue Viles
ATTORNEYS

No. 733,732. PATENTED JULY 14, 1903.
J. MÜLLER.
SCREEN FOR HOP SEPARATING MACHINES.
APPLICATION FILED MAR. 11, 1903.
NO MODEL. 2 SHEETS—SHEET 2.
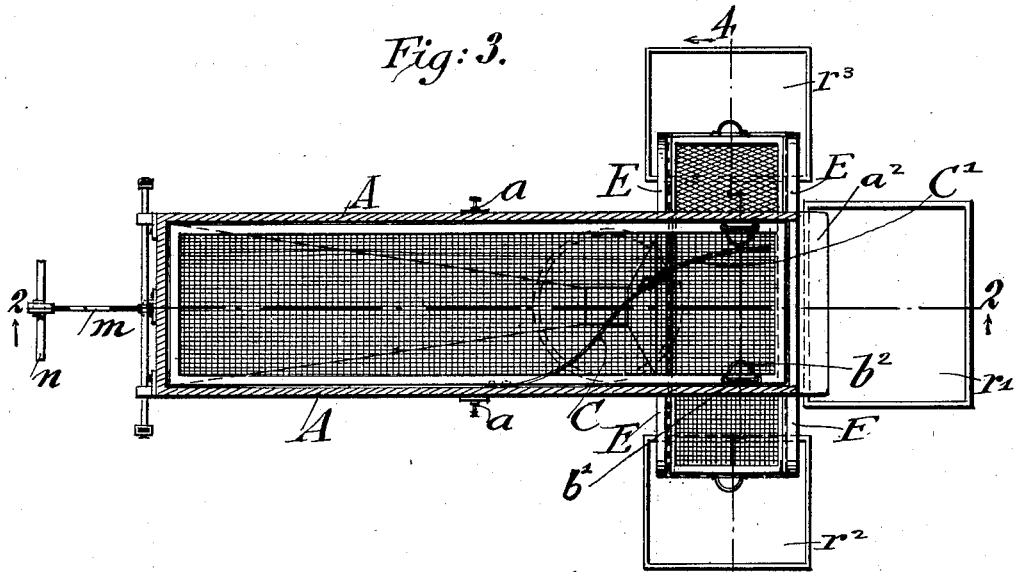
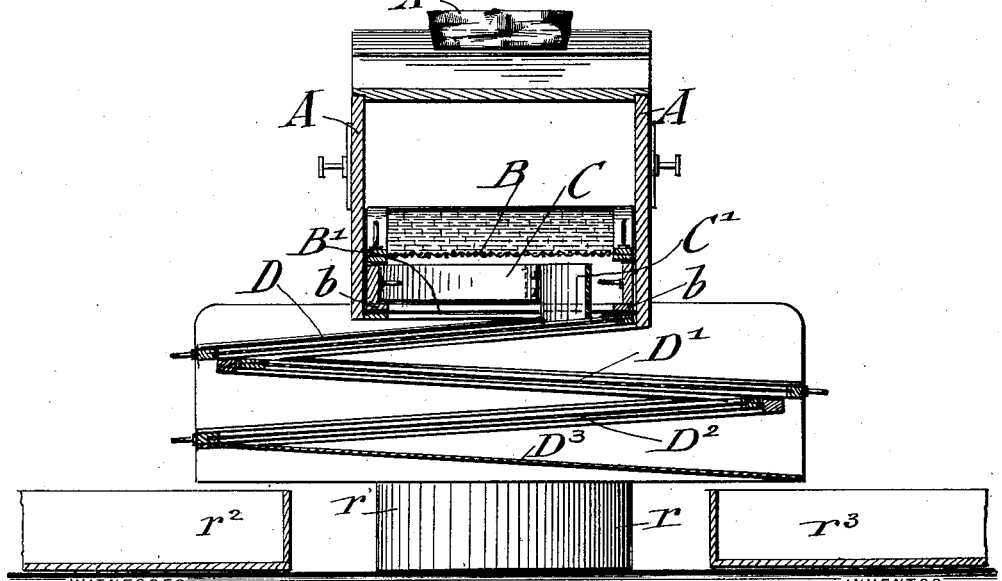

No. 733,732.

Patented July 14, 1903.

UNITED STATES PATENT OFFICE.

JACOB MÜLLER, OF NEW YORK, N. Y., ASSIGNOR TO CAROLINE H. MÜLLER, OF NEW YORK, N. Y.

SCREEN FOR HOP-SEPARATING MACHINES.

SPECIFICATION forming part of Letters Patent No. 733,732, dated July 14, 1903.

Application filed March 11, 1903. Serial No. 147,300. (No model.)

*To all whom it may concern:*

Be it known that I, JACOB MÜLLER, a citizen of the United States, residing in New York, borough of the Bronx and State of New York, have invented certain new and useful Improvements in Screens for Hop-Separating Machines, of which the following is a specification.

This invention relates to an improved screen for separating hops from the seeds after they have been separated from their stems by one of the well-known machines used for this purpose, such as the one for which Letters Patent were granted to me, No. 314,146, and dated March 17, 1885, or any other suitable machine; and the invention relates more specifically to a compound screen by which the larger leaves of the hop-scales are separated from the seeds and the smaller leaves from the lupulin or fine gummy particles in a very effective manner in four separate receptacles, so that the seeds and other parts which are not used in brewing processes are separated from the lupulin, scales, and leaves, which permits thereby a better utilization of the hop-seeds in the brewing process, as the objectionable parts of the same have been separated; and for this purpose the invention consists of a screen for separating hop-scales after they are removed from their stems which comprises an oscillating shaker provided with a bottom screen and conveying-hopper and a plurality of inclined screens arranged below the lower end of the shaker, said screens being of different character and degrees of fineness, so as to separate the hop-scales from the seeds, lupulin, and smaller particles and pass each into suitable receptacles; and the invention consists, further, of certain details of construction and combinations of parts, which will be fully described hereinafter and finally pointed out in the claims.

Figure 1:
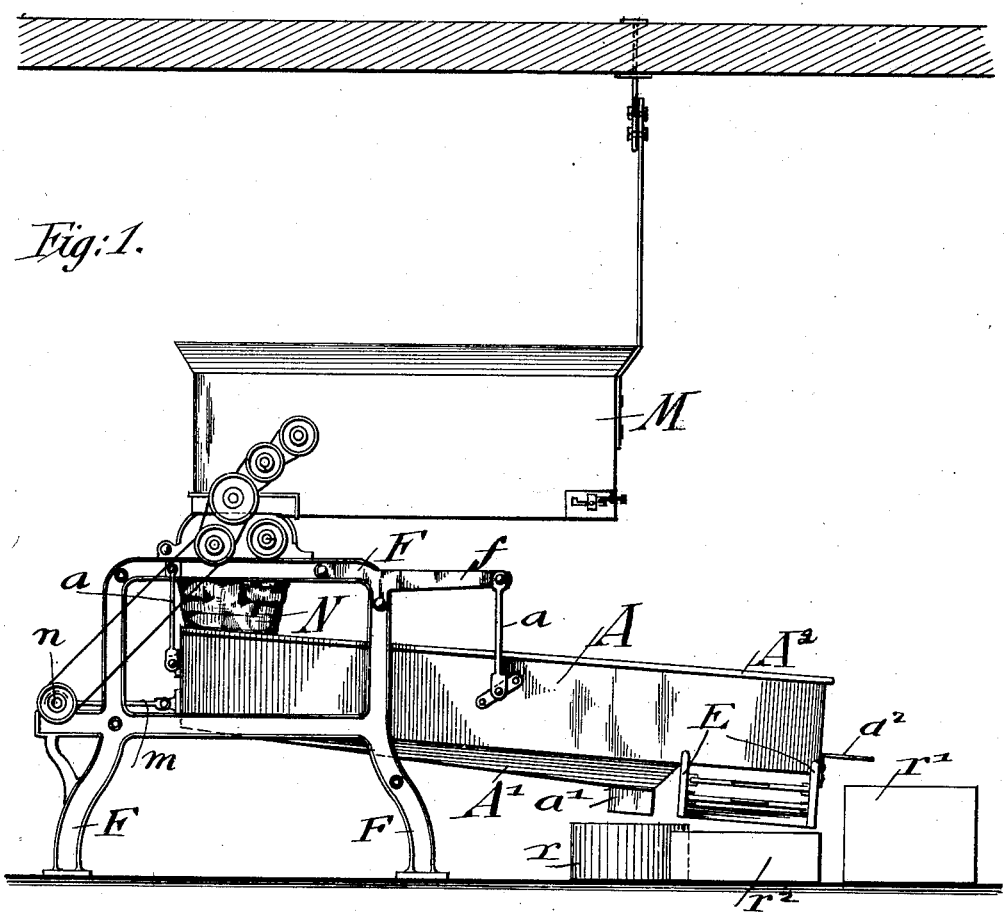
Figure 2:
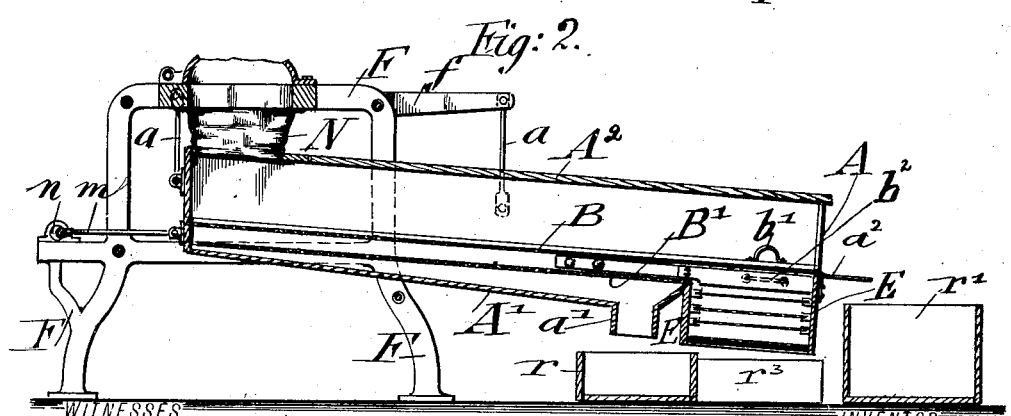

In the accompanying drawings, Figure 1 represents a side elevation of my improved screen for separating hop-scales, shown as connected with a machine for removing the hop-scales from their stems. Fig. 2 is a vertical longitudinal section on line 2 2, Fig. 3, of my improved separating-screen. Fig. 3 is a top view of Fig. 2, partly in horizontal section through the upper portion of the shaker; and Fig. 4 is a vertical transverse section on line 4 4, Fig. 3.

Similar letters of reference indicate corresponding parts.

Referring to the drawings, F F represent the upright side standards of a supporting-frame, on the upper part of which is supported a machine M for removing the hop-scales from their stems, said machine being constructed in any approved manner, preferably of the construction shown in the patent hereinbefore referred to, from which the material is discharged by a funnel N. From the side standards F and forwardly-extending bracket-arm $f$ of the same is suspended by pivoted hanging rods $a$ a shaker A, to which an oscillating or shaking motion is imparted by a cam-shaft $n$, supported in bearings on brackets of the supporting-standards F. To the shaft $n$ is connected a strap and link $m$, which connects with one end of the shaker A. The shaker A is supported on the hanger-rods $a$ in slightly downwardly-inclined position and preferably closed at the top by a removable top $A^2$. The shaker A is provided with a removable screen B of comparatively coarse mesh, (one-eighth of an inch,) resting on a second screen B', shorter than the screen B, and of somewhat finer mesh, (one-tenth of an inch,) which rests on lugs $b$ of the shaker A. Between the cleats of the screens B and B' is arranged a packing of leather or other suitable material to prevent the fine dust from passing in between the cleats. Below the second or lower screen B' is arranged a hopper-shaped bottom A', which terminates in a spout $a'$, that discharges into a receptacle $r$. This receptacle $r$ serves to collect the finer yellow gummy particles, which are known by the name of "lupulin" and which are found between the hop-leaves near the stems. These particles pass through the comparatively coarse screens B B', while the larger leaves, which do not pass through the upper screen B, are conducted over the entire length of the screen B and discharged over a delivery lip or plate $a^2$ into a receptacle $r'$ at the right-hand end of the shaker A, as shown clearly in Figs. 1 and 2. The screen B is provided with handles $b'$ and the screen B' with handles $b^2$ for removing the screens for cleaning the same from time to time. Between the screens B and B' and to one side of the shaker A is attached a flat spring or resilient piece of metal C, which extends almost to the opposite side of the shaker, as shown clearly in Fig. 3. The spring C serves for conducting the particles that pass through the screen B, but not through the second screen B', to an uppermost screen D of a series of screens. The end of the spring C is provided with a leather guard-plate C', that is of greater depth than the spring C, so as to form at its lower edge contact with the uppermost laterally-inclined screen D, which is supported at the lower end of the shaker A, as shown in Fig. 4. The material which does not pass through the screen B' falls on the screen D, and that material which does not pass through the screen D passes over the entire length of the same from the upper to the lower edge, where the larger seeds, which cannot pass through the screen D, fall into a receptacle $r^2$. A second screen D' is arranged below the screen D, but inclined in opposite direction thereto and serves for assorting the material, such as the fine leaves, small pieces of stem, &c., which passed through the screen D. The particles which do not pass through the screen D' as fine leaves fall into a receptacle $r^2$, while those which do pass through the screen D' fall on the third screen $D^2$, arranged below the second screen D' and extending from the delivery end of the screen D' parallel with the uppermost screen D. The particles which do not pass through the screen $D^2$ as fine seeds pass into the receptacle $r^2$, while those that pass through as fine leaves fall onto an inclined bottom of sheet metal $D^3$, located below the lowermost screen. The inclined screens D D' $D^2$ are guided in alternately-inclined ways of end bars E, that are attached to the right-hand end of the shaker, as shown in Fig. 1, and are provided at their front lowermost ends with suitable handles for being removed from their guideways for cleaning and for being replaced in the same after being cleaned. The meshes of the screens D D' $D^2$ gradually increase in fineness from the uppermost to the lowermost screen and differ in the character of their mesh, so that the seeds and particles of a certain character drop into the next screen below, while the particles of a different kind and size that do not pass through the respective screens are conducted into receptacles.

By the separating-screens described a very effective separation of the four principal parts from which hop-scales are composed after being removed from their stems is effected—namely, the fine gummy particles or lupulin into the receptacle $r$, the larger leaves into the receptacle $r'$, the larger and smaller seeds into the receptacle $r^2$, and the smaller leaves and stems into the receptacle $r^3$. Thus the parts are collected in four separate and distinct receptacles, which are so arranged and located that each receptacle can be taken away separately for use in the brewing process and then returned or others substituted. Then the distinct separation of the parts offers certain advantages, as the seeds impart a disagreeable bitter taste to the hop extract, while by the separation of the lupulin from the leaves a larger yield of the hop-bitter and the essential oils of the hops is obtained, and thereby a better utilization of the hops in the brewing process than in the process heretofore in use, in which the hops were utilized without being first separated from the stems.

Having thus described my invention, I claim as new and desire to secure by Letters Patent—

1. In a screen for separating hop-scales after they are removed from their stems, the combination, of a shaker provided with an open end, a screen in said shaker, a second shorter screen of finer mesh below said first screen, a hopper having a discharge-spout below said second screen, a spring-actuated guard arranged between the upper and lower screens of the shaker, said guard being attached to one side of the shaker and extended longitudinally across the lower screen and into the space below the upper screen, a plurality of alternately-inclined screens below the open end of the shaker and adjacent to the lower screen, and an inclined bottom below said inclined transverse screens, substantially as set forth.

2. The combination, with an inclined oscillating shaker open at the lower end and provided with a discharge-lip, of a screen extending the full length of said shaker, a shorter screen of finer mesh below the first screen, a hopper provided with a discharge-spout below said lower screen, a plurality of laterally-inclined screens extending across the lower open end of the shaker to alternately opposite sides thereof, said screens being supported on inclined ways of end bars, a spring-actuated guard arranged between the screens of the shaker for conducting the particles which do not pass through the lower screen to the inclined end screens, said guard device extending through the open end of the shaker into contact with the uppermost inclined end screen, an inclined bottom below the plurality of alternately-inclined end screens, and receptacles for receiving the different particles separated by the different screens, substantially as set forth.

In testimony that I claim the foregoing as my invention I have signed my name in presence of two subscribing witnesses.

JACOB MÜLLER.

Witnesses:
    PAUL GOEPEL,
    C. P. GOEPEL.